Patented June 30, 1942

2,288,320

UNITED STATES PATENT OFFICE 2,288,320

PROCESS OF PREPARING CHROMIUM OXIDE GEL CATALYSTS

Glen H. Morey, Terre Haute, Ind., assignor to Phillips Petroleum Company, a corporation of Delaware No Drawing. Application November 27, 1936, Serial No. 113,091

23 Claims. (Cl. 252—254)

This invention relates to an improved process of preparing catalysts and it has particular relation to improvements in a process of preparing catalysts of gel characteristics and containing chromium oxide as a constituent of the gel.

Catalysts which contain chromium oxide and which possess gel characteristics have been used industrially to facilitate the conversion of various raw materials into more useful or economically more desirable materials, as by the hydrogenation or dehydrogenation of chemical compounds. For example, the catalysts may be used for converting hydrocarbons by changing their carbon-to-hydrogen ratio at elevated temperatures below about 600° C. Such use of a chromic oxide gel catalyst has been described in the United States Letters Patent No. 1,905,383 issued to W. F. Huppke and F. E. Frey, April 25, 1933 for a Method of hydrogenating or dehydrogenating hydrocarbons and in an article by Frey and Huppke published in Industrial and Engineering Chemistry, vol. 25, January, 1933, pages 54 to 59. In its preparation a dilute solution of a chromic salt is used and a hydrous precipitate is formed by mixing with an alkali solution such as a solution of ammonia or of sodium or potassium hydroxide. The precipitate is then washed and dried under suitable conditions for obtaining in the end a coherent and catalytically active gel. In certain cases, as has been disclosed in the co-pending application of Frey and Huppke, Serial No. 723,608, filed May 2, 1934 for a Process for converting hydrocarbons, now U. S. Patent 2,098,959 issued November 16, 1937, it is desirable to incorporate with the chromic oxide one or more difficultly reducible and difficultly fusible oxides, such as alumina, zirconia, thoria. silica, magnesia, titania and boric oxide, in such a way that the gel characteristics are conserved. Heavy metal oxides, such as those of thallium, bismuth, lead and mercury may also in certain cases contribute desirable qualities to the gel catalyst.

Heretofore, in the preparation of these catalysts of gel characteristics and consisting of chromium oxide or containing chromium oxide as a constituent of the gel, it has been considered necessary that the chromium be in the form of a soluble trivalent chromium salt. Experience, however, has shown time and again that all solutions of chromic salts do not uniformly lead to the formation of catalysts of the stable gel characteristics which have been found desirable in catalysts to be used, for example, in processes of converting hydrocarbons by changing their carbon-to-hydrogen ratio at elevated temperatures. For example, when ammonium hydroxide is added to a solution of chromic sulfate, chromic chloride or the violet chromic nitrate, a light blue-green precipitate of chromic hydroxide usually results which is granular and chalk-like in appearance, which lacks gel characteristics, and which has little or no catalytic activity for the dehydrogenation of paraffin hydrocarbons or for the hydrogenation of olefin hydrocarbons. By contrast, the desired precipitate is a dark olive green in color, very gelatinous, relatively very voluminous and yields a gel of high catalytic activity. In other words, the customary methods used for the preparation of chromium oxide gels from trivalent chromium salts bought as such in the chemical market not infrequently result in more or less complete failure to yield precipitates which can be dried to make a catalyst of the desired gel characteristics and catalytic activity. In some cases even complete failure to obtain any precipitate at all upon the addition of ammonium hydroxide to a solution of a chromic salt has been experienced. In such cases, which have been most frequently observed with chromic sulfate, a partial or incomplete precipitation could be effected by prolonged boiling but the dried precipitate was largely devoid of gel characteristics and was inferior or worthless for catalytic purposes. The reasons for these failures are doubtless quite complex and are not at present completely understood. But it is clear that in consequence of these frequent failures, methods used at present are not only at times unreliable but can be inordinately wasteful of material and energy; for large quantities of catalyst are required in processes conducted on the modern commercial scale and failure of a batch of chemicals to yield the desired precipitate involves a large loss in chemicals and labor.

A further important disadvantage of methods used heretofore is their failure to utilize uniformly hexavalent chromium in the form of soluble chromates or dichromates, which is much less expensive than trivalent chromium in the form of a soluble chromic salt. The hexavalent chromium in chromates or dichromates must first be reduced to the trivalent condition before precipitation of chromic hydroxide or hydrated chromium oxide can be effected. After the reduction, which is a step well known in chemical art, the difficulties already mentioned may lead to failure to obtain the desired dark olive green gelatinous precipitate from the resultant trivalent chromium. Such failures are well-known in chemical literature. A pertinent example occurs in a recent article published by Lazier and Vaughen in the Journal of the American Chemical Society, vol. 54, August, 1934, wherein on page 3083 there appears the following statement: "The reduction of chromic acid with alcohol followed by precipitation with ammonium hydroxide is a well-known step in the separation of chromium from certain other elements. When this method was applied to the preparation of chromium oxide catalysts, the precipitates formed were different in character from those obtained under similar conditions from trivalent salts. The precipitates from reduced chromates were of a chalky blue-green color and had a powdery texture after washing and drying, whereas the hydrated oxides prepared from the trivalent salts were dark green and dried to glossy gel-like masses."

Another marked disadvantage of methods used heretofore for the preparation of catalysts of gel characteristics and consisting of chromium oxide or containing chromium oxide as a constituent of the gel is that the presence of the sulfate radical in substantial amount in the solution of chromic salt, as for example in a solution of chromic sulfate or of chrome alum, invariably leads to the formation of a catalyst of decidedly inferior catalytic activity for the conversion of hydrocarbons by changing their carbon-to-hydrogen ratio at elevated temperatures. This has in the past largely prevented the economical recovery of spent catalysts, which contain the catalytically inactive green form of chromic oxide, since this green form of chromic oxide is insoluble in all ordinary acids but it can be made to dissolve in hot concentrated sulfuric acid if a small proportion of chromium with a valence greater than three such as the chromium in chromic acid is present as a dissolution catalyst.

It is the object of my invention to avoid the difficulties and disadvantages of the prior art that have been briefly described and to obtain uniformly and at will catalysts of good and stable gel characteristics and consisting of chromium oxide or containing chromium oxide as a constituent of the gel and active in effecting hydrogenation and dehydrogenation of chemical compounds.

It is a further object of my invention to obtain such catalysts irrespective of the raw material source of the chromium, whether it be a trivalent chromium salt on the one hand or a hexavalent chromium compound on the other.

A still further object of my invention is to use the relatively inexpensive and easily obtained sulfuric acid for the purpose of dissolving spent catalysts and thus making available the catalytic elements in a form suitable for reworking into a catalytically active gel.

Additional objects and advantages of my invention will be obvious to those skilled in the art.

I have found that catalysts of the desired gel characteristics and catalytic activity containing chromium oxide are obtained uniformly and at will if the chromium is first prepared in the form of a colloidal sol of chromic oxide in the presence of not more than about one-half as much of a monobasic acid such as for example hydrochloric, or nitric acid, or acetic or other monocarboxylic acid of four or less carbon atoms, as would be required to convert all of the oxide to the corresponding normal chromic salt. The chromic oxide used for preparing such a colloidal sol may be in the form of the light blue green precipitate of chromic hydroxide or hydrated oxide which is not infrequently obtained when a solution of an alkali is mixed with a solution of a chromic salt or with a solution prepared by the reduction of a hexavalent chromium compound to the trivalent condition and which appears very frequently when the solution contains a substantial proportion of the sulfate radical. Chromic oxide which results from the precipitation of chromic salts by addition of alkali is more or less hydrous and may vary widely in color and physical characteristics, sometimes exhibiting the desirable olive green color or gelatinous texture to a certain degree. Such precipitates are in general suitable for making a colloidal sol in my process.

The manner of using my invention and of obtaining its useful and novel advantages will be evident from the following detailed description. A quantity of chromic hydroxide or hydrated oxide is obtained by precipitation with an alkali from a solution of a trivalent chromium salt or from a solution prepared by the reduction of a hexavalent chromium compound to the trivalent condition, irrespective of whether or not such solution contains a substantial proportion of the sulfate radical. The hydrated oxide is separated from the solution by filtration or the equivalent and may be washed with water to reduce the content of occluded salts or ions. The hydrated oxide is then treated with about 25 per cent as much of a monobasic acid, such as hydrochloric or nitric acid, or acetic or other monocarboxylic acid of four or less carbon atoms, as would be required to convert all of the chromic hydroxide or oxide to the corresponding normal chromic salt, and then the resulting mass is triturated vigorously until it becomes a homogeneous appearing liquid or colloidal sol resembling paint. The water content of the mixture is preferably sufficient to produce a buttery to creamy consistency. The mass is stirred rapidly at a temperature of about 100° C. until it becomes very thick and viscous, which may require several hours. A small representative sample of the thick viscous sol is then taken and diluted with hot water and precipitated by the addition of an alkali, advantageously ammonium hydroxide, in slight excess. If the test precipitate thus obtained is dark olive green in color and very gelatinous in consistency the main body of the sol is diluted with hot water, preferably distilled water, and precipitated with a solution of an alkali, advantageously with a solution of ammonium hydroxide, and then conditions are favorable for proceeding with the subsequent washing and drying steps in the preparation of the catalyst. If the test precipitate does not possess the desired characteristics of a dark olive green color and a very gelatinous consistency, a small additional amount of the monobasic acid, suitably one-tenth as much as was used originally in the preparation of the sol, is added to the main body of the sol and the stirring and heating is continued for some time longer, after which another test precipitate is prepared. It will be found that the precipitate has become more gelatinous and a darker green in color. If it is still not of the most desirable appearance another small addition of acid is made and the stirring and heating continued as before, and another test precipitate prepared. This is continued until the test precipitate does not show improvement in the desired characteristics of a dark olive green color and a very gelatinous consistency, or until it has reached a degree of color and gelatinous consistency that are known from experience to be suitable. The final dark olive green and very gelatinous precipitate obtained from the main body of the sol will result, after washing and drying under suitable conditions for obtaining in the end a coherent and stable gel, in a catalyst possessing the desired catalytic properties, such, for example, as are required to promote the economical and clear-cut dehydrogenation of paraffin hydrocarbons into the corresponding olefins at elevated temperatures of up to about 600° C.

It is not intended from the foregoing description of my invention that the hydrated chromic oxide used for preparing the colloidal sol must be freshly precipitated. I have successfully used hydrated chromic oxide that had been precipitated many days or weeks before use and I have found that hydrated chromic oxide that had been dried until it was comparatively free from moisture is also satisfactory for use by my process. In such a case, it may be found to be more efficacious to use one of the stronger monobasic acids in preparing the colloidal sol.

Other oxides besides chromic oxide may be introduced as constituents of the final gel catalyst. This may be accomplished in various ways that will be obvious to those skilled in the art. For example, they may be incorporated together with the chromic oxide in the colloidal sol of my process and then coprecipitated with the chromic oxide upon dilution and mixing with an alkaline precipitant. Alternatively, the gelatinous precipitate obtained by adding an alkaline reagent to the chromic oxide sol may be triturated with a hydrous oxide of another species, such as alumina, zirconia, or others, or also with a heavy metal oxide, such as an oxide of thallium, bismuth, lead or mercury, and the oxide mixture dried thereafter to yield the desired mixed catalyst of gel characteristics.

It is not intended that the proportion of acid to be used in the preparation of the colloidal sol should be limited to 25 per cent of the amount required to convert all of the chromic oxide to the corresponding normal chromic salt. I have found that the amount of acid required depends somewhat on the character of the chromic oxide and on the presence of electronegative radicals in the form of salts. It will usually range from 5 to 50 per cent of the chromic hydroxide equivalent but need not in any case exceed the latter figure. Enough acid may be used to prevent the resultant sol from depositing more than a slight precipitate upon dilution with hot water. However, more than a slight precipitate upon such dilution is tolerated by my process if the precipitate is of the desired dark olive green color and gelatinous consistency; but the appearance of appreciable amounts of a light blue green and powdery precipitate indicates that additional acid, accompanied by further heating and digesting, is necessary. In general, it will be found well not to use more than half enough acid to react with all of the chromic oxide. The water content of the mixture need not be so low as to produce a viscous mixture or to require trituration to obtain efficient digesting action, but cannot be so high that the chromic hydroxide content of the mixture is less than 10 weight per cent of the mixture.

The temperature of about 100° C. used for heating or digesting the colloidal sol is not critical and somewhat higher or lower temperatures may be used, the conversion to the final thick and viscous sol form proceeding more rapidly at the higher temperatures. In the final stages of this step the temperature may be 20° C. or more above 100° C. Still higher temperatures may be used if the sol is heated under pressure in an autoclave. Although this modification of my invention involves the use of rather expensive equipment, it has the advantage that the duration of the heating can be thereby materially shortened. It is evident that the most desirable and economical procedure is that which yields the chromic oxide in sol form suitable for the dilution and precipitation steps at the minimum over-all cost for chemicals, equipment and operating expenses.

I wish to make it clear that my invention does not contemplate the use of merely long-continued boiling of a relatively dilute solution of a chromic salt accompanied by stepwise addition of an alkaline precipitant such as ammonia. Such a procedure gives little or no improvement in the characteristics of the precipitate, namely, a dark olive green color, a gelatinous consistency and relatively very great specific volume, which I have found to be necessary for its use in the preparation of a superior dehydrogenation catalyst such as is uniformly produced by my process. For example, one mol, 298 grams, of sodium dichromate, $Na_2Cr_2O_7.2H_2O$, was reduced with sugar in hydrochloric acid solution to form a solution of chromic chloride. The solution was diluted to 20 liters and heated to boiling under a reflux condenser which condensed escaping moisture and returned it to the solution. One-half of the amount of ammonium hydroxide required for complete precipitation was added and the boiling was continued. Small quantities of ammonium hydroxide were added every few hours over a continuous period of four days, while the resulting mixture was kept at its boiling temperature, until the solution was basic to litmus. During this period small samples of the solution were taken at intervals and ammonium hydroxide was added in slight excess. The resultant precipitate was always a light blue green in color and of a non-gelatinous powdery consistency or texture. No improvement or transition to a dark olive green color and a gelatinous consistency was observed during the four days boiling of the solution. The mixture, which now contained all of the chromium as precipitated hydroxide, was boiled for two more days but the precipitate did not show any noticeable improvement. The precipitate was washed, filtered and dried in the identical manner used for obtaining good catalysts when using a dark, olive green, gelatinous precipitate. This preparation, however, showed a very inferior catalytic performance, giving only 5 per cent dehydrogenation of isobutane to isobutylene at 450° C. at a flow rate of 2500 cc. of gas per hour per cc. of catalyst and this conversion fell to less than one per cent in about 3 hours. On the other hand, a catalyst made from the same reagents and in the same manner except that the heating and precipitation were made in accordance with my process, gave a conversion of isobutane to isobutylene of 17 per cent for 30 hours under the same conditions of testing.

The dilution of the colloidal sol with hot water prior to mixing with an alkali is not critical. Its chief purpose is to render the sol readily movable, as through plant piping, and any suitable amount of water to achieve this end may be used. I have successfully used volumes of water varying from about 1 to over 100 times the volume of the thick viscous sol. Heated water is preferable to cold water, since the latter will sometimes cause the sol to be thrown out of suspension.

Distilled water may be generally preferable for use in my process but it is not always necessary. I have made highly satisfactory catalysts when cistern or impounded rainwater was used and also when pond or lake water was used. However, it is possible that in some geographical localities natural waters may contain deleterious substances that should be avoided; in such cases, which can be readily determined by trial, distilled water should be used.

The precipitate obtained by adding an alkaline reagent such as ammonia to the diluted sol yields a coherent and vitreous gel upon drying which is highly suitable with respect to mechanical properties for use as a solid catalyst. Drying may be effected partially in air and completed with the aid of heat. The gel so obtained constitutes a particularly efficient catalyst.

The addition to the digested mixture of an alkaline precipitant and the washing by water prior to drying are essential parts of my procedure and while their omission does not prevent the formation of a vitreous gel on drying, the gel so obtained is an inferior catalyst for hydrogenation and dehydrogenation of hydrocarbons.

By the practice of my invention, I have repeatedly succeeded in overcoming the difficulties and disadvantages of the prior art. I have been able to obtain uniformly and at will catalysts of good and stable gel characteristics and consisting of chromium oxide or containing chromium oxide as a constituent of the gel and possessing the desired catalytic activity such as is advantageous for the conversion of hydrocarbons by changing their carbon-to-hydrogen ratio at elevated temperatures. I have obtained repeatedly and without exception such catalysts from chromic salts obtained as such in the chemical market or obtained as chromates or dichromates and subsequently reduced, and from chromium-containing materials which were known to be incapable of yielding catalysts of the desired characteristics by any of the methods used heretofore for this purpose. I have obtained good catalysts by my invention from chromic sulfate, from chromic chloride, from the violet chromic nitrate and from chromic solutions containing substantial proportions of sulfuric acid or of the sulfate radical, all of which materials constituted in the past unreliable and for the most part very unsatisfactory sources of chromium for the desired catalysts when earlier methods of preparation were used. I have also succeeded in repeatedly recovering spent catalysts, which contain the green and catalytically inactive form of chromic oxide by dissolving them in hot concentrated sulfuric acid in the presence of chromium with a valence greater than three, such higher valence chromium acting as a dissolution catalyst as mentioned previously, and then treating the resulting sulfate solution with alkali to precipitate chromic hydroxide or hydrated oxide and thereafter using the precipitate for the preparation of a colloidal sol of chromic oxide in the manner hereinbefore described. It is advantageous, before effecting solution of the spent catalyst in hot concentrated sulfuric acid, to burn off any carbonaceous deposit that may be on the spent catalyst, as by heating the spent catalyst in a current of air. By all of these ways my invention has made the production of catalysts of gel characteristics and containing chromium oxide a reliable, uniformly successful and economical process.

Although I have many times successfully prepared catalysts by the practice of my invention, I shall limit my descriptions of specific and detailed examples to three which indicate a few of the possible variations of procedure. It is understood that the details given in these three examples are illustrative only and are not to be construed as in any way limiting the scope of my invention.

*Example I*

In my first example one mol, 298 grams, of sodium dichromate, $Na_2Cr_2O_7 \cdot 2H_2O$, was reduced with sugar in the presence of an excess of sulfuric acid. The resulting chromic sulfate solution was diluted with about 10 liters of hot water and ammonium hydroxide in slight excess was added to the hot solution to precipitate the chromium. The resultant precipitate of hydrated chromic oxide was of a light blue green color and of a powdery or chalk-like consistency. It was washed by decantation, filtered and pressed to remove excess water. The precipitate was then triturated in about 410 cc. of hydrochloric acid of specific gravity 1.19 until no lumps remained. The resultant homogeneous-appearing mixture was heated with rapid stirring at about 100° C. or more for about an hour. A small amount of the sol, which was now quite thick and viscous, was then diluted with hot water and precipitated with ammonium hydroxide. Since the precipitate did not have the desired characteristics of a dark olive green color and of a gelatinous consistency, 25 cc. more of hydrochloric acid of the same strength was added to the main body of the sol and the stirring and heating was continued for about three additional hours. A second test precipitate then showed the desired dark olive green color and gelatinous consistency. Accordingly, the main body of the sol was diluted with 10 liters of hot water and hydrated chromic oxide was precipitated by the addition of aqueous ammonia in slight excess. After filtering, washing and pressing to remove excess water, the dark olive green and gelatinous precipitate of hydrated chromic oxide was dried to a hard, black, glossy, vitreous gel which was catalytically very active, rugged and long-lived for the conversion of isobutane to isobutylene.

*Example II*

A second specific detailed example of the use of my process is as follows. One mol, 298 grams, of sodium dichromate, $Na_2Cr_2O_7 \cdot 2H_2O$, was reduced with sugar in the presence of hydrochloric acid. Three-fourths of the resulting chromic chloride solution was diluted to 20 liters with hot water and ammonia in slight excess was added to the hot solution to precipitate the chromium as hydrated chromic oxide. The precipitate was a light blue green in color and chalk-like in consistency. It was washed by decantation, filtered and pressed to remove excess water. The other one-fourth of the chromic chloride solution obtained from the reduction of the sodium dichromate was boiled down to a thick syrup. The precipitate of hydrated chromic oxide and the syrup were mixed together and triturated vigorously in a mortar until a homogeneous-appearing liquid sol resulted. The sol was stirred rapidly over a boiling water bath for one hour. A small amount of the sol was then diluted with hot water and precipitated with ammonium hydroxide. The precipitate did not possess the desired characteristics of a dark olive green color and a gelatinous consistency. Accordingly, 15 cc. of concentrated hydrochloric acid was added to the sol and the stirring was continued over a hot glycerine bath for some time. A second test precipitate then showed considerable improvement, and 10 cc. more of concentrated hydrochloric acid was added and the stirring and heating was continued. After some time a third test precipitate was obtained. Since this third test precipitate possessed the desired dark olive green color and gelatinous consistency, the main body of the sol was diluted with about 20 liters of hot water and ammonium hydroxide was added in slight excess to precipitate the chromium as hydrated chromic oxide. The precipitate was filtered, washed and pressed to remove excess water. Upon drying, the precipitated hydrated chromic oxide became a hard, black, glossy, vitreous gel which was catalytically very active, rugged and long-lived when tested with isobutane for conversion of isobutane to isobutylene at elevated temperatures up to about 550° C.

*Example III*

In my third specific example, 400 grams of violet crystalline chromic nitrate, $Cr(NO_3)_3.9H_2O$, were melted by heating. Then 140 cc. of 28 per cent aqua ammonia were added stepwise while the mixture was stirred and heated. Continued heating and evaporation caused the light blue chalky precipitate first formed to become dispersed to form a homogeneous-appearing sol and further heating and evaporation made the sol very thick and viscous. After three hours of heating and stirring during which the temperature increased to 122° C., a portion diluted with hot water and treated with a slight excess of ammonium hydroxide yielded a dark olive green and gelatinous precipitate. Accordingly, the main body of the thick sol was diluted with about 10 liters of hot water and hydrated chromic oxide was precipitated by the addition of aqua ammonia in slight excess. The hydrated chromic oxide was washed three times by decantation, filtered, pressed to remove excess water, and dried to a hard black glossy vitreous gel. The final dried gel possessed excellent catalytic activity for the conversion of gaseous paraffins to olefins and was rugged and long-lived.

I do not wish to exclude from my invention certain modifications or alternatives which are obvious to those skilled in the art. For example, instead of a monobasic acid mentioned hereinbefore in connection with the preparation of the sol of chromic oxide, it is obvious from the specific examples cited that an equivalent amount of the corresponding chromic salt can be employed, since neutralization and hydrolysis reactions proceed reversibly to produce in either case free acid and chromic salt. Likewise in the preparation of mixed catalysts, the acid may be introduced in a chemically combined state with one or more of the metallic elements of the catalyst other than chromium, as in the form of one or more salts. Chromic salts of monobasic acids have the characteristic that they are hydrolyzed in aqueous solution to give the free acid, and other metallic salts of monobasic acids, which possess this characteristic may be used in place of the monobasic acids or in place of the corresponding chromic salts and may be regarded as equivalents in the discussion or claims. Of course, it is obvious that the salts of metals which would impair the catalytic activity of the final gel should not be used. Furthermore, I do not wish to limit my invention to the use of only the monobasic acids specifically mentioned hereinbefore, namely, hydrochloric, nitric, and acetic acids, for the suitability of an acid for use in my process can be readily determined by trial. Hence, I desire to have it understood that, within the scope of the appended claims, my invention is as extensive in scope and equivalents as the prior art allows.

I claim:

1. A process for preparing a catalyst of gel characteristics and containing chromium oxide as a constituent of the gel comprising preparing an aqueous colloidal sol by mixing chromic oxide and a concentrated aqueous solution of a monobasic acid whose normal chromic salt is soluble in water and hydrolyzes to give free acid insufficient in amount to convert more than 50 per cent of the chromic oxide into the corresponding normal salt, digesting said sol at a temperature of about 100° C. mixing the colloidal sol with a solution of an alkali in slight excess, precipitating dark gelatinous chromium oxide and washing and drying the resultant precipitate.

2. A process of preparing catalysts of gel characteristics and containing chromium oxide as a constituent of the gel comprising agitating hydrated chromic oxide comprised of blue, chalky chromium oxide with a hot aqueous solution of a chromic salt of a monobasic acid whose normal chromic salt is soluble in water and hydrolyzes to give free acid to produce a colloidal solution, the amount of such salt not exceeding that which contains monobasic acid radicals chemically equivalent to the hydrated chromic oxide, heating and digesting the colloidal solution, diluting the solution with hot water, mixing the diluted solution with a slight excess of a solution of an alkali, and washing and drying the resulting dark, gelatinous precipitate.

3. In a process of preparing catalysts of gel characteristics and containing chromium oxide as a constituent of the gel, the steps which comprise heating a precipitated hydrous chromic oxide in the blue, chalky form, intermixed with not more than one half as much of a monobasic acid whose normal chromic salt is soluble in water and hydrolyzes to give free acid as would be required to convert all of the chromium present into the corresponding normal chromic salt for such a time that a thick viscous colloidal sol of chromium oxide is obtained and digested, diluting said sol with at least an equal volume of hot water, adding to the dilute solution alkali in slight excess and precipitating chromium oxide as a dark, gelatinous precipitate.

4. In a process of preparing chromium oxide gel, the step which comprises digesting a mixture comprising bluish, chalky hydrous chromic oxide and a concentrated acidic aqueous medium whose anions consist substantially entirely of anions of a monobasic acid whose normal chromic salt is soluble in water and hydrolyzes to give free acid, said mixture containing said anions in such an amount, not to exceed one-half of the chemical equivalent of the total chromium present figured as trivalent chromium, and said digesting being continued for such a period that a thick viscous sol is obtained that is capable of yielding a dark green and gelatinous precipitate on addition of an alkali in slight excess, and subsequently adding a solution of an alkali in slight excess.

5. A process for the preparation of a catalyst of gel characteristics and containing chromium oxide as a constituent of the gel, which comprises digesting a mixture comprising bluish chalky hydrous chromic oxide and a concentrated acidic aqueous medium whose anions consist substantially entirely of anions of a monobasic acid whose normal chromic salt is soluble in water and hydrolyzes to give free acid, said mixture containing said anions in such an amount, not to exceed one-half of the chemical equivalent of the total chromium present figured as trivalent chromium, and said digesting being continued for such a period that a thick viscous sol is obtained that is capable of yielding a dark green and gelatinous precipitate on subsequent addition of an alkali in slight excess, mixing said sol with a solution of an alkali in slight excess, thereby precipitating dark green and gelatinous hydrous chromic oxide, and washing and drying the resultant precipitate.

6. A process for the preparation of a catalyst of gel characteristics and containing chromium oxide as a constituent of the gel, which comprises digesting at about 100° C. a mixture comprising bluish chalky hydrous chromic oxide and a concentrated acidic aqueous medium whose anions consist substantially entirely of anions of a monobasic acid whose normal chromic salt is soluble in water and hydrolyzes to give free acid, said mixture containing said anions in such an amount, not to exceed one-half of the chemical equivalent of the total chromium present figured as trivalent chromium, and said digesting being continued for such a period that a thick viscous sol is obtained that is capable of yielding a dark green and gelatinous precipitate on subsequent addition of an alkali in slight excess, diluting said sol with at least an equal volume of hot water, mingling said diluted sol with a solution of an alkali in slight excess, thereby precipitating dark green and gelatinous hydrous chromic oxide, and washing and drying the resultant precipitate.

7. The process of claim 5 in which the said bluish chalky hydrous chromic oxide has been obtained by recovery from a spent catalyst containing chromium oxide by dissolution of the spent catalyst in hot concentrated sulfuric acid in the presence of a small amount of chromium having a valence greater than three and precipitation from the resultant sulfuric acid solution by an alkali in slight excess.

8. The process of claim 5 in which the alkali is ammonium hydroxide.

9. The process of claim 6 in which the said acidic aqueous medium is a concentrated solution of a monobasic acid.

10. The process of claim 6 in which the said acidic aqueous medium is a concentrated solution of a monobasic acid selected from the group consisting of hydrochloric, nitric, and monocarboxylic acid of not more than four carbon atoms per molecule.

11. The process of claim 5 in which the said acidic aqueous medium is concentrated hydrochloric acid.

12. The process of claim 5 in which the said acidic aqueous medium is concentrated nitric acid.

13. The process of claim 6 in which the said acidic aqueous medium is a concentrated solution of a chromic salt.

14. The process of claim 5 in which the said acidic aqueous medium is a concentrated solution of a chromic salt from which about two thirds of the chromium has been precipitated as the hydrous chromic oxide of said mixture.

15. A process for the preparation of a catalyst of gel characteristics and containing chromium oxide as a constituent of the gel, which comprises digesting at about 100° C. a mixture comprising bluish chalky hydrous chromic oxide and about one-fourth as much of a concentrated aqueous solution of a monobasic acid whose normal chromic salt is soluble in water and hydrolyzes to give free acid as would be required to convert all of the chromic oxide to the corresponding normal chromic salt until the mixture becomes a very thick and viscous sol, adding from time to time additional smaller amounts of the monobasic acid while continuing the digesting until a small test portion of the thick viscous sol, when diluted with hot water and treated with a solution of an alkali, yields a dark green and gelatinous precipitate, the total amount of monobasic acid not exceeding one-half that required to convert all of the chromic oxide to normal chromic salt, then diluting the main portion of the thick viscous sol with hot water, mixing the diluted sol with an alkali in slight excess, thereby precipitating dark green and gelatinous hydrous chromic oxide, and washing and drying the resultant precipitate.

16. A process for the preparation of a catalyst of gel characteristics and containing chromium oxide as a constituent of the gel, which comprises digesting at about 100° C. a mixture comprising bluish chalky hydrous chromic oxide and a concentrated aqueous solution of a chromic salt of a monobasic acid, in an amount containing about one-half as much chromium as said chromic oxide, until the mixture becomes a very thick and viscous sol, adding from time to time additional small amounts of the chromic salt while continuing the digesting until a small test portion of the thick viscous sol, when diluted with hot water and treated with a solution of an alkali, yields a dark green and gelatinous precipitate, the chromium in the total amount of chromic salt added not exceeding the total amount of chromium in the said hydrous chromic oxide, then diluting the main portion of the thick viscous sol with hot water, mixing the diluted sol with an alkali in slight excess, thereby precipitating dark green and gelatinous hydrous chromic oxide, and washing and drying the resultant precipitate.

17. A process of preparing a chromium oxide gel, which comprises digesting a mixture comprising bluish chalky hydrous chromic oxide in a concentrated acidic aqueous medium whose anions consist substantially entirely of anions of a monobasic acid whose normal chromic salt is soluble in water and hydrolyzes to give free acid, said mixture being acidic to an extent not greater than that substantially equivalent to a mixture of chromic oxide and one-half its chemical equivalent of such a monobasic acid, said digesting being continued for such a period of time that a sol is obtained that is capable of yielding a dark green and gelatinous precipitate on the subsequent addition of an alkali in slight excess, diluting said sol with hot water, adding an alkali in slight excess to precipitate dark green and gelatinous hydrous chromic oxide, and washing and drying the resultant precipitate.

18. A process for the preparation of a catalyst of gel characteristics and containing chromium oxide as a constituent of the gel along with a difficultly reducible oxide of an element of the group consisting of aluminum, zirconium, titanium, silicon, thorium, boron, and magnesium, which comprises digesting at a temperature of about 100° C. a mixture comprising bluish chalky hydrous chromic oxide and a concentrated aqueous solution of a soluble salt of a monobasic acid, the metallic element of said salt being a member of the group consisting of aluminum, zirconium, titanium, silicon, thorium, boron, and magnesium, in an amount not to exceed about one-half as much of said salt as is equivalent to said chromic oxide, until the mixture becomes a thick viscous sol that is capable of yielding a dark green and gelatinous precipitate on subsequent addition of an alkali in slight excess, mixing said sol and a solution of an alkali in slight excess to precipitate dark green and gelatinous hydrous chromic oxide along with a gelatinous hydrous oxide of said metal, and drying the precipitate to form a dried gel.

19. In the preparation of a chromium oxide gel catalyst the steps comprising adding concentrated ammonium hydroxide to a concentrated solution of chromic nitrate with stirring, continuing the said mixing with agitation of the mixture to effect addition to the solution of approximately 70% of the ammonia required to precipitate the metal as the hydroxide, diluting said solution by the addition of water, adding to said diluted solution ammonium hydroxide to precipitate chromium hydroxide as a gelatinous mass, separating said precipitate from said solution, and drying the precipitate to form a black vitreous chromium oxide catalyst.

20. The process of claim 5 in which said acidic aqueous medium is a concentrated solution of a salt containing a desired metallic constituent of said catalyst, other than chromium, and possessing the characteristic of hydrolyzing in aqueous solution to give the free acid.

21. The process of claim 19 in which said concentrated solution of chromic nitrate is prepared by melting chromic nitrate nonahydrate.

22. The process of claim 5 in which said acidic aqueous medium is a concentrated solution of an aluminum salt of a monobasic acid.

23. The process of claim 5 in which said acidic aqueous medium is a concentrated solution of a zirconium salt of a monobasic acid.

GLEN H. MOREY.